Patented Apr. 20, 1954

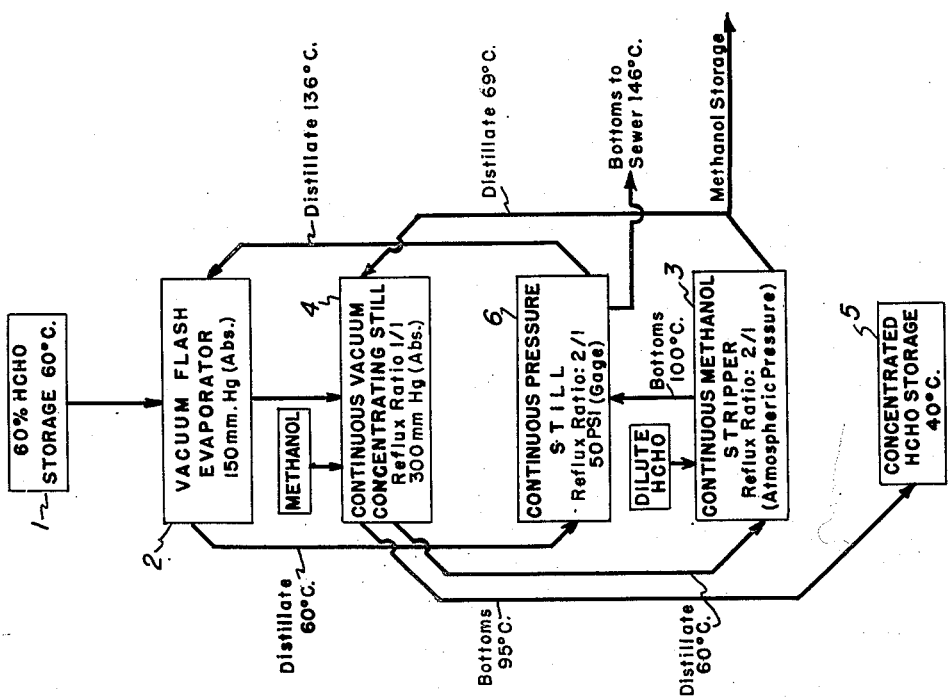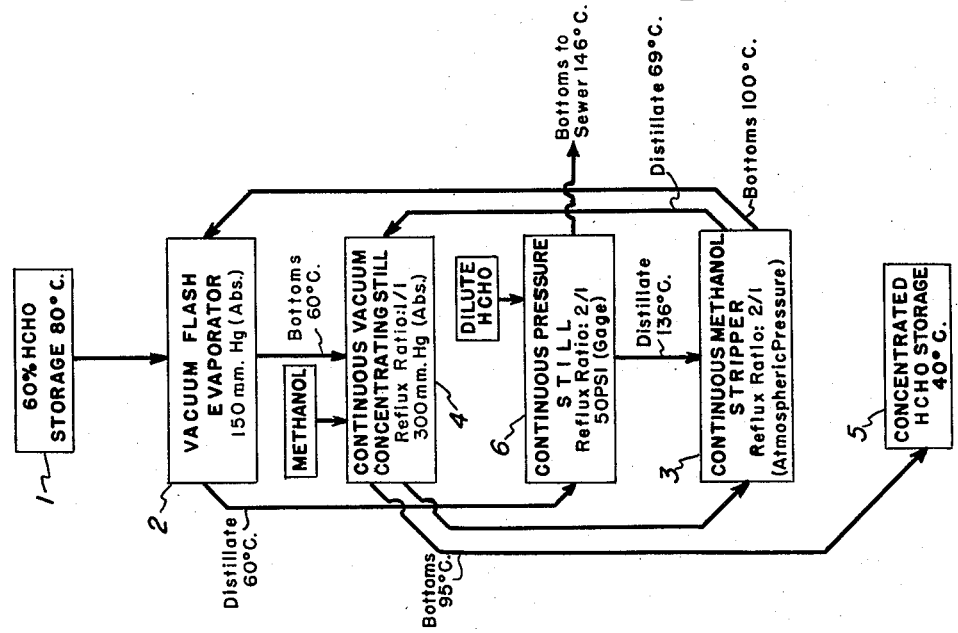

2,676,143

UNITED STATES PATENT OFFICE 2,676,143

FORMALDEHYDE CONCENTRATION PROCESS

Donald D. Lee, Charleston, W. Va., and Herbert S. Lecky, Orange, Tex., assignors to E. I. du Pont de Nemours & Company, Wilmington, Del., a corporation of Delaware Application November 22, 1949, Serial No. 128,888

6 Claims. (Cl. 202—39)

This invention relates to a process for the concentration of dilute aqueous formaldehyde and more particularly to a process for the preparation of substantially water-free formaldehyde.

Dilute aqueous solutions of formaldehyde are frequently encountered in manufacturing processes, for example, in the manufacture of para formaldehyde from aqueous formaldehyde and in the catalytic oxidation and dehydrogenation of alcohols. The concentration of such solutions is a matter of considerable difficulty. The behavior of aqueous formaldehyde solutions on distillation under various conditions of temperature and pressure indicates that the partial pressure of formaldehyde over these solutions is in reality the decomposition pressure of dissolved formaldehyde hydrate which further complicates the removal of water.

Various methods have been proposed for concentrating formaldehyde which have included such processes as distilling formaldehyde solutions under pressure with the use of a dephlegmator by which means some concentration of the solution can be effected. Pressure distillations have likewise been employed but are limited by the fact that formaldehyde tends to undergo the Cannizzaro reaction forming methanol and formic acid on heating with water, the rate at which this reaction takes place increases rapidly with rising temperatures. According to Ledbury and Blair (J. Chem. Soc. 127, 26 (1925)), 9% of the formaldehyde is lost because of this reaction in a distilaltion at 100 lbs. pressure, whereas only 2% is lost at 60 lbs.

An object of the present invention is to provide an economical process for the preparation of substantially water-free formaldehyde. Another object of the invention is to provide a process in which dilute aqueous solutions of formaldehyde are evaporated, a water-formaldehyde mutual solvent added to the residue, and the resulting mixture subjected to distillation for the recovery of a substantially water-free solution of formaldehyde in an organic solvent. Yet another object of the invention is to provide a process for the preparation of a substantially water-free concentration of formaldehyde in methanol solution. Other objects and advantages of the invention will hereinafter appear.

According to the invention a dilute aqueous solution of formaldehyde is subjected to evaporation during which the solution is subjected to a sufficiently high temperature, preferably under a partial vacuum, to remove rapidly an appreciable quantity of the water present. The resulting concentrated aqueous formaldehyde is diluted with a suitable organic solvent such, for example, as methanol, and the resulting organic solvent-formaldehyde solution now containing but a relatively small amount of water is subjected to distillation, preferably conducted under reduced pressure. The residue from this distillation contains the aldehyde, the solvent and substantially no water.

The process of the invention can be more readily understood by reference to the accompanying flow sheet. In accord with the process depicted in this flow sheet, which constitutes a preferred embodiment of the invention, a solution of substantially 60% formaldehyde in water, which may be stored at a temperature of approximately 80° C. in a suitable vessel 1, is fed to a vacuum flash evaporator 2 into which there is likewise fed the bottoms from a continuous methanol stripper 3, these bottoms containing a mixture of formaldehyde, water and methanol. The bottoms from the vacuum flash evaporator 2 are discharged to a continuous vacuum concentrating still 4 in which they are combined with concentrated methanol and the distillate from a continuous methanol stripper 3. This distillate contains formaldehyde, water and methanol, the methanol being present in a high concentration. From the continuous vacuum concentrating still 4 the residue recovered, containing a high concentration of formaldehyde, methanol and less than 5% water, is fed to the storage tank 5. The distillate from the continuous vacuum concentrating still 4 is passed to the continuous methanol stripper 3 wherein it is subjected to atmospheric pressure distillation, the distillate being returned to the continuous vacuum concentrating still 4 and the bottoms to the vacuum flash evaporator 2. In this continuous process for the concentration of formaldehyde, the distillate from the vacuum flash evaporator 2 is charged into the continuous pressure still 6 wherein it is subjected to pressure distillation. The distillate from still 6 is fed to the continuous methanol stripper 3, the bottoms being discharged to sewer.

Aqueous solutions of dilute formaldehyde with or without a solvent such as methanol, may be introduced into the system as described, either directly to the continuous pressure still 6 or directly to the continuous methanol stripper 3. If such dilute solutions contain precipitatable residues resulting from removal of the organic solvent during high temperature and pressure distillation, the solution is preferably fed into the methanol stripper 3, the bottoms being transferred to the pressure still 6 rather than to the vacuum flash evaporator 2 and the distillate from the pressure still 6 being returned to the flash evaporator 2 rather than to the methanol stripper 3. Figure 2 is a flowsheet illustrating this method of operation.

The equipment used to carry out the operations of the flowsheet preferably involves any suitable storage tank 1, a vacuum flash evaporator 2 in which the flash evaporation of the formaldehyde, water, methanol solution is effected at a pressure below about 300 mm. mercury pressure absolute. The continuous vacuum concentrating still 4 is likewise operated under a vacuum of less than about 600 mm. mercury pressure absolute and with a reflux ratio of about 1 to 1. The continuous pressure still 6 is operated under a pressure of more than 20 p. s. i. g. up to about 300 p. s. i. g. with a reflux ratio that may range from 1½ to 5 to 1. The continuous methanol stripper 3 is operated at pressures between 600 and 1000 mm. Hg abs. with a reflux ratio of about 1½ to 3 to 1. The storage tank 5, inasmuch as it contains the concentrated formaldehyde methanol solution with 4% water or less, is maintained at a temperature of approximately 40° C. to prevent loss of formaldehyde to reaction products and likewise its solidification which occurs at lower temperatures.

The solvent to be added to the evaporation residues is preferably a mutual solvent for the aldehyde and water, such as the lower aliphatic alcohols, including methanol, ethanol, N- and iso-propanol and N- and iso-butanols. Other non-polar solvents may likewise be employed and preferably those that boil below 125° C. at 760 mm. but care should be exercised in selecting these solvents in order that they do not react with the aldehyde to produce undesirable by-products.

An important use for the process of the instant case is to provide a formaldehyde substantially free from water. This is accomplished by the production of formaldehyde in organic solvents such as methanol and as this solution is for use in the arts, it necessarily follows that the organic solvent in which the formaldehyde is concentrated should not deleteriously affect the course of the reaction or other purpose for which the formaldehyde is to be employed.

The process is applicable to the concentration of substantially any aqueous solution of formaldehyde but it is particularly directed to the concentration of formaldehyde in the range of from 5 to 15% and from 50 to 70% to give, for all intents and purposes, an aldehyde which on a solvent-free basis is in effect a better than 90% formaldehyde.

The examples which follow describe preferred embodiments of the invention in which parts are by weight unless otherwise indicated.

Example 1.—A solution containing formaldehyde, water and methanol, in the ratio of approximately 58%, 36% and 6% respectively, is subjected to vacuum flash evaporation 2 at a temperature of approximately 60° C. and under a pressure of approximately 150 mm. mercury pressure absolute. The distillate from this evaporation is then subjected to a continuous pressure distillation 6 at about 50 p. s. i. g., a 2/1 reflux ratio and under a temperature of approximately 136° C. The bottoms from this distillation 6 are discarded and the distillate passed to a continuous methanol stripper 3 operated at substantially atmospheric pressure with a reflux ratio of 2/1 and under a temperature of approximately 69° C. The distillate from this continuous methanol stripper 3 is returned to a continuous vacuum concentration still 4 and the bottoms are returned to the vacuum flash evaporator 2. The concentrated liquor (bottoms) from the vacuum flash evaporator 2 at a temperature of approximately 60° C. and about 150 mm. Hg. (abs.), is fed into a continuous vacuum concentration still 4, substantially concentrated methanol added and the resulting mixture subjected to a distillation at a temperature of approximately 60° C. using a reflux ratio of approximately 1 to 1 and a vacuum of approximately 300 mm. mercury absolute. The distillate from the continuous vacuum concentration still 4 is passed to the continuous methanol stripper 3 referred to above. The residue from this continuous vacuum concentration still 4 is passed to storage 5 and contains approximately 66% formaldehyde, 30.5% methanol and 3.5% water. In accord with this series of operations, a highly concentrated formaldehyde solution in methanol is obtained.

Example 2.—The influence of reflux ratio and feed strength is illustrated by Table I for the concentration of formaldehyde solutions by continuous vacuum fractionation at about 300 mm. Hg (abs.).

TABLE I

Concentration of formaldehyde solutions—continuous vacuum fractionation (300 mm.)

| | | | |
|---|---|---|---|
| Reflux Temp. (° C.) | 52–55 | 63–64 | 65–67 |
| Pot Temperature (° C.) | 85–87 | 92–95 | 96–100 |
| Total Press. (mm. Hg abs.) | 300 | 300 | 300 |
| Reflux Ratio | 2/1 | 1/1 | 1/1 |
| HCHO in Feed (Percent) [1] | 43.1 | 43.3 | 43.3 |
| HCHO in Dist. (Percent) | 6.0 | 24.2 | 30.1 |
| HCHO in Tails (Percent) | 65.8 | 67.1 | 73.3 |
| H$_2$O in Feed (Percent) | 10.9 | 7.3 | 7.3 |
| H$_2$O in Dist. (Percent) | 8.3 | 11.7 | 10.2 |
| H$_2$O in Tails (Percent) | 5.9 | 2.5 | 1.12 |
| MeOH in Feed (Percent) | 46.0 | 49.4 | 49.4 |
| MeOH in Dist. (Percent) | 85.7 | 64.1 | 59.7 |
| MeOH in Tails (Percent) | 23.3 | 30.4 | 25.9 |
| HCHO Conc. on MeOH free basis: | | | |
| Feed (Percent) | 80.0 | 85.5 | 85.5 |
| Dist. (Percent) | 42.0 | 67.4 | 74.6 |
| Tails (Percent) | 92.0 | 96.5 | 98.5 |

[1] All compositions as weight percent.

Example 3.—Concentration of formaldehyde solutions under continuous pressure fractionation 50 p. s. i. g. is illustrated in Table II:

TABLE II

Concentration of formaldehyde solutions—continuous pressure fractionation (50 lb./sq. in.)

| | | |
|---|---|---|
| Reflux Temp. (° C.) | 136 | 139 |
| Pot Temp. (° C.) | 144 | 146 |
| Total Press. (p. s. i. gage) | 50 | 50 |
| Reflux Ratio | 4/1 | 4/1 |
| HCHO in Feed (Percent) [1] | 27.6 | 13.5 |
| HCHO in Dist. (Percent) | 39.9 | 28.5 |
| HCHO in Tails (Percent) | 15.7 | 0.19 |
| H$_2$O in Feed (Percent) | 52.5 | 75.5 |
| H$_2$O in Dist. (Percent) | 25.8 | 55.1 |
| H$_2$O in Tails (Percent) | 83.4 | 98.81 |
| MeOH in Feed (Percent) | 19.9 | 11.0 |
| MeOH in Dist. (Percent) | 34.3 | 16.4 |
| MeOH in Tails (Percent) | 0.9 | 1.00 |
| HCHO Conc. on MeOH free basis: | | |
| Feed (Percent) | 34.4 | 15.2 |
| Dist. (Percent) | 60.8 | 34.1 |
| Tails (Percent) | 15.8 | 0.19 |

[1] All compositions as weight percent.

Example 4.—A solution containing formaldehyde and water in the ratio of approximately 10% formaldehyde and 90% water is subjected to continuous pressure distillation 6 at about 50 p. s. i. g. at a 2/1 reflux ratio and under a temperature of approximately 136° C., in a still into which there is also introduced a stream containing methanol and smaller quantities of formaldehyde and water from the vacuum flash evaporation step 2. The bottoms from this distillation 6 are discarded and the distillate passed to a continuous methanol stripper 3 operated at substantially atmospheric pressure with a reflux ratio of 2/1 and under a temperature of approximately 69° C. The distillate from this continuous methanol stripper 3 is fed to a continuous vacuum concentration still 4 and the bottoms are fed to the vacuum flash evaporator 2. The vacuum flash evaporator 2 is operated at a temperature of approximately 60° C. and under a pressure of approximately 150 mm. Hg (abs.). The distillate from this evaporation is the second stream mentioned above as being fed to the continuous pressure distillation 6. The concentrated liquor from the vacuum flash evaporator 2 at a temperature of approximately 60° C. and about 150 mm. Hg (abs.), is fed into a continuous vacuum concentration still 4, substantially concentrated methanol added, and the resulting mixture subjected to a distillation at a temperature of approximately 60° C. using a reflux ratio of approximately 1 to 1 and a vacuum of approximately 300 mm. mercury absolute. The distillate from the continuous vacuum concentration still 4 is passed to the continuous methanol stripper 3 referred to above. The residue from this continuous vacuum concentration still 4 is passed to storage 5 and contains approximately 66% formaldehyde, 30.5% methanol, and 3.5% water. Storage 5 is maintained at approximately 40° C. In accord with this series of operations, a highly concentrated formaldehyde solution in methanol is obtained.

In the concentration of formaldehyde in accord with the process, it is usually desirable to introduce into the aqueous formaldehyde during the vacuum concentration 4, in parts by weight, approximately one-half part of the organic solvent per part of formaldehyde being concentrated. This may range between about $\frac{1}{10}$ to 2 parts of the organic solvent per part of the formaldehyde and particularly for the concentration of formaldehyde with methanol as the solvent. The preferred concentration is between 0.40 and 0.50 part of methanol per part of formaldehyde.

The concentration of formaldehyde by the process of the invention may be carried out discontinuously, i. e. by a batch process, as well as by the continuous process of the examples. For small installations the batch process may be preferred while for large installations the continuous process is recommended.

We claim:

1. In a process for dehydrating formaldehyde, the steps which comprise flash evaporating a solution of formaldehyde containing about 60% formaldehyde at a pressure below 300 mm. of mercury, passing the distillate to pressure distillation and the bottoms to vacuum concentration under a pressure of less than 600 mm. of mercury, during vacuum concentration adding methanol, passing the bottoms to concentrated formaldehyde storage and distillate to a methanol stripping operation, during pressure distillation passing the distillate to the methanol stripping operation and the bottoms to sewer, during the methanol stripping operation passing the distillate to vacuum concentration and the bottoms to vacuum flash evaporation.

2. In a process for dehydrating formaldehyde, the steps which comprise flash evaporating a solution of formaldehyde containing about 60% formaldehyde at a pressure below 300 mm. of mercury, passing the distillate to pressure distillation and the bottoms to vacuum concentration under a pressure of less than 600 mm. of mercury, during vacuum concentration adding methanol, passing the bottoms to concentrated formaldehyde storage and distillate to a methanol stripping operation, during pressure distillation, adding a dilute aqueous solution of formaldehyde in methanol while passing the distillate to the methanol stripping operation and the bottoms to sewer, during the methanol stripping operation passing the distillate to vacuum concentration and the bottoms to vacuum flash evaporation.

3. In a process for dehydrating formaldehyde, the steps which comprise flash evaporating a solution of formaldehyde containing about 60% formaldehyde at a pressure below 300 mm. of mercury, passing the distillate to pressure distillation and the bottoms to vacuum concentration under a pressure of less than 600 mm. of mercury, during vacuum concentration adding methanol, passing the bottoms to concentrated formaldehyde storage and the distillate to a methanol stripping operation, during pressure distillation passing the distillation to flash evaporation and the bottoms to sewer, during the methanol stripping operation adding a dilute aqueous solution of formaldehyde in methanol while passing the distillate to vacuum concentration and the bottoms to the continuous pressure operation.

4. In a process for dehydrating formaldehyde, the improvement which comprises in one step flash evaporating a solution of formaldeyhde containing 50% to 70% formaldehyde at a pressure below approximately 300 mm. of mercury, in the second step subjecting the distillate from the first step to distillation under a pressure between 20 and 300 p. s. i. gauge, returning the distillate from the second step to the first step, in a third step subjecting the effluent from the first step to vacuum concentration under a pressure of less than 300 mm. of mercury in the presence of from 0.4 to 2.0 parts of methanol per part of formaldehyde by weight, in the fourth step stripping methanol from the distillate of the third step, returning the distillate containing methanol to the third step and the effluent to the second step and in a fifth step recovering from the effluent of the third step concentrated formaldehyde, on a methanol-free basis, containing less than 4% water.

5. In a process for dehydrating formaldehyde, the improvement which comprises in one step flash evaporating a solution of formaldehyde containing 50 to 70% formaldehyde at a pressure below 300 mm. of mercury, in the second step subjecting the distillate from the first step to continuous distillation under a pressure between 20 and 300 p. s. i. gauge, and returning the distillate thereof to the first step, in a third step subjecting the effluent from the first step to vacuum concentration in the presence of methanol and under a pressure of less than 600 mm. of mercury, in a fourth step stripping methanol from the distillate of the third step, during which stripping operation dilute formaldehyde is added, and returning the effluent to the second step, the methanol recovered being passed to storage, and in a fifth step passing the effluent from the third step to concentrated formaldehyde storage maintained at a temperature above 40° C.

6. In a process for dehydrating formaldehyde to give a concentrated formaldehyde in methanol substantially water free, the improvement which comprises in the first step flash evaporating a solution of formaldehyde containing at least 50% formaldehyde at a pressure below at least 300 mm. of mercury, in a second step subjecting the distillate from the first step to continuous pressure distillation at a pressure between 20 and 300 p. s. i. gauge, during which operation dilute formaldehyde is introduced, in the third step subjecting the effluent from the first step to a continuous vacuum concentration in the presence of added methanol and at a pressure of less than about 600 mm. of mercury, in the fourth step stripping methanol from the combined distillate of the second and third steps by an atmospheric pressure stripping operation, returning the effluent from the methanol stripping operation to the first step and the distillate to the third step and in a fifth step discharging the effluent from the third step to concentrated formaldehyde storage wherein it is maintained at a temperature of about 40° C.

References Cited in the file of this patent

UNITED STATES PATENTS

| Number | Name | Date |
|---|---|---|
| 1,662,179 | Zimmerli | Mar. 13, 1928 |
| 1,948,069 | Fuchs et al. | Feb. 20, 1934 |
| 2,153,526 | Walker | Apr. 4, 1939 |
| 2,256,497 | Reynolds | Sept. 23, 1941 |
| 2,565,569 | McCants | Aug. 28, 1951 |

OTHER REFERENCES

"Formaldehyde," by J. F. Walker. Copyright 1944 by Reinhold Publishing Corporation. Pages 58–63.